Jan. 20, 1959     M. C. PIETERSE     2,869,377
DEVICES FOR THE TRANSMISSION OF MOVEMENTS
Filed Sept. 13, 1954     2 Sheets-Sheet 2
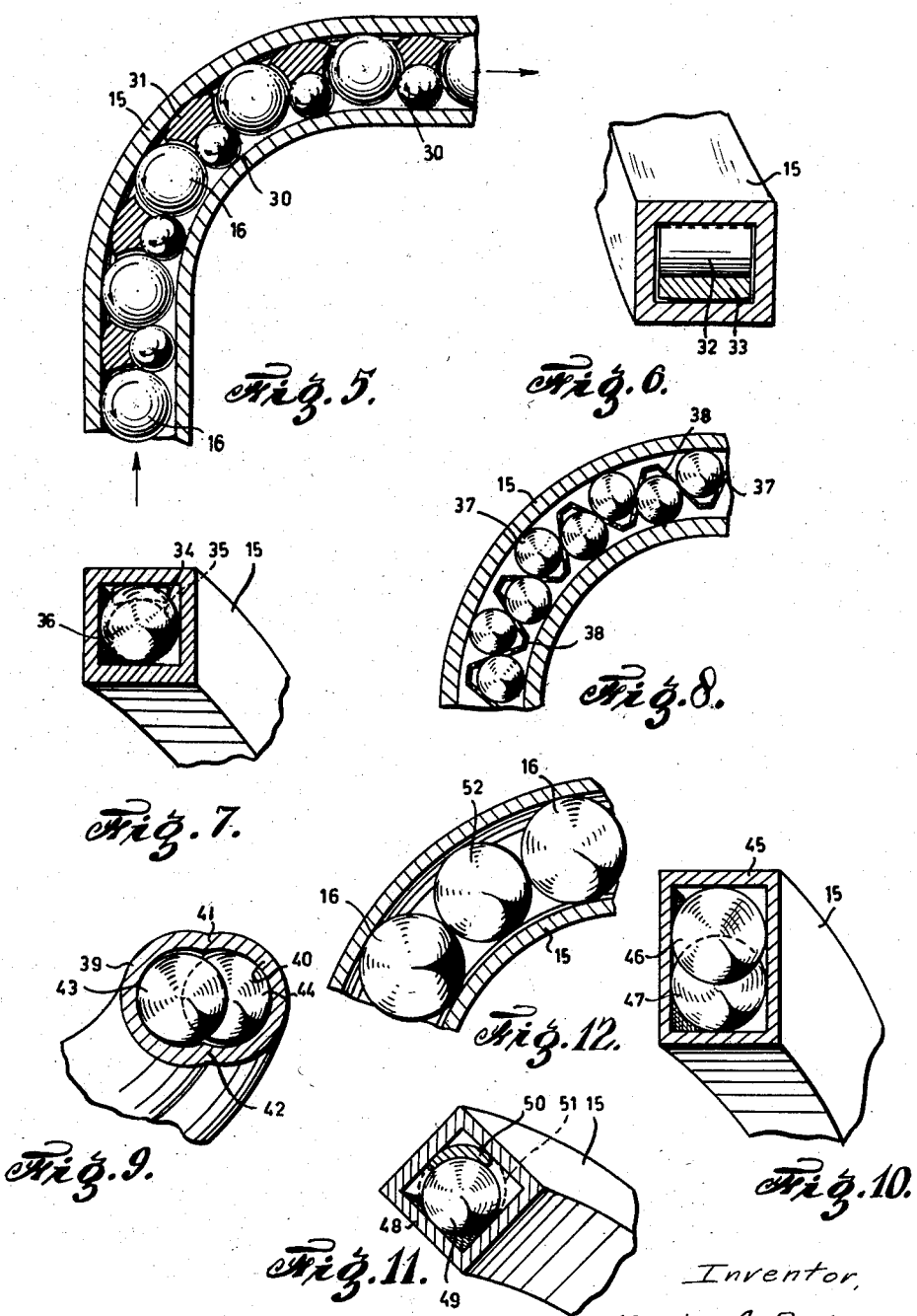
Inventor,
Marius C. Pieterse,
by Hall & Houghton
Attorney.

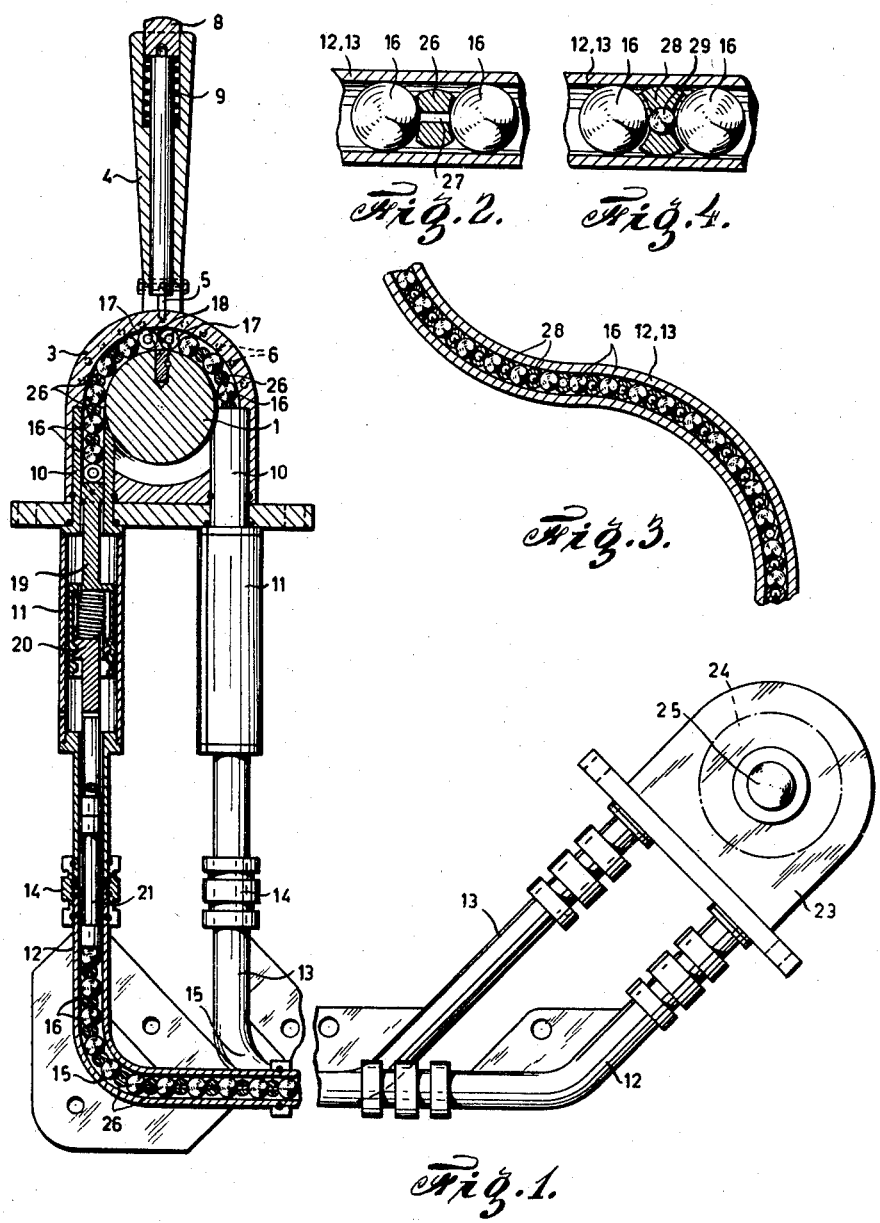

United States Patent Office 2,869,377
Patented Jan. 20, 1959

2,869,377
DEVICES FOR THE TRANSMISSION OF MOVEMENTS

Marius Cornelis Pieterse, Voorschoten, Netherlands

Application September 13, 1954, Serial No. 455,648

6 Claims. (Cl. 74—216.3)

This invention relates to a device for the transmission of movement, comprising a stationary guide tube filled with movable pushing members fitting movably in said guide tube and at least in a curved part of said tube consisting at least in part of balls or rollers.

It is an object of this invention to reduce friction during the transmission of movement in such a device to a minimum.

It is a further object of this invention to obtain a device of the above indicated kind, which operates reliably and which gives the least rise to inaccuracies owing to clearances during the transmission of movement.

It is a further object of this invention to obtain a device of the above given kind, which is of simple structure and with parts which are easy to manufacture.

This invention will now be described on the basis of the accompanying drawings, which give several possible embodiments of devices according to the present invention.

Figure 1 shows in side view and partly in section a device according to a preferred embodiment of this invention for the remote control of a member such as a valve for a hydraulic system, for instance for varying the pitch of the propeller blades of a vessel.

Figure 2 shows on a larger scale part of the device of Fig. 1 in section.

Figure 3 shows schematically a double curve, forming part of a device according to Fig. 1, the curve being filled with pushing members differing from those according to Figure 1.

Figure 4 shows part of the modification of Figure 3 on a larger scale.

Figures 5–12 inclusive show axial and transverse sections of guide tubes or parts thereof filled with pushing members according to several other embodiments of this invention.

Referring particularly to Fig. 1 the device shown has a transmitter, comprising a flat disc 1, rotatable about a central axis in a casing 3, of which the inner wall surrounds and embraces the periphery of the disc 1 with some clearance concentrically therewith. An operating handle 4 is secured to said disc 1 and straddles casing 3 in order to be secured to the central axis shaft or trunnions of disc 1. Handle 4 is thus able to rotate the disc 1 in both directions about its axis.

Handle 4 is automatically fixed in the neutral position shown in the drawing and in a number of other positions by a pawl 5, able to engage circular detents 6 in one of the side walls of casing 3. By pushing button 8 in handle 4 downwards against the action of spring 9 it is possible to move pawl 5 from the detent 6 to allow movement of handle 4.

Two tubular joints 10 are arranged parallel to one another tangential to the annular space between disc 1 and the inner wall of casing 3. Said joints constitute the connection with two tubes 11, to the other ends of which are connected two guide tubes 12 and 13, leading to the remote receiver 23 and constituting together with casing 3, receiver 23 and tubes 11 a closed circuit with pushing members in the tube for the transmission of movement. Couplings 14 connect the separate parts of the guide tubes and said tubes may have a number of curves or bends such as 15.

In the upper half of the annular space between disc 1 and casing 3 and in the curved parts 15 of the system circular rolling bodies such as balls or rollers 16 are arranged so that they fit movably therein. The disc 1 carries two rollers 17 in brackets 18, said rollers being freely rotatable and being arranged symmetrically with respect to a line through handle 4 and the center of disc 1. The pushing members 16 in the annular space between disc 1 and casing 3 could be cylindrical rollers, and in the curves 15 of the guide tubes 12 and 13 could be balls. The tubes preferably have a circular cross section.

In the joints 10 the rollers 16 abut against a pushing rod 19, guided for axial movement in the tubes 11 and comprising in each tube an adjusting device 20 for automatically compensating clearance in the system. As this compensating device does not constitute part of the present invention and as such devices are known per se it will not be described in detail here. Rod 19 is in pushing contact with a rod 21 and said rod 21 abuts the first of a set of balls 16 in the curve 15.

The last ball in each set preferably abuts a rod which may be identical to rod 21 engaging the first ball. Additional straight and curved tube sections, couplings, sets of balls or rollers, and rods are provided as required to connect the transmitter to the receiver. The receiver may be substantially identical to the transmitter and may have a circular disc 24 such as disc 1 of the transmitter, said disc 24 being connected through shaft 25 to the member to be controlled, for instance to the movable part of a valve of a hydraulic system. Of course it is not possible to use pushing rods such as 21 in any parts of the guide tubes which are considerably curved, such as curves 15 shown in Fig. 1, and this is true both for 90° curves and for curves of a different angle. All the curves as well as the receiver 23 are filled with balls or rollers such as the balls or rollers 16 as shown in the drawing.

The receiver 23 as well as the transmitter could easily be embodied in a different manner, for instance so that the guide tubes 12 and 13 at the transmitter and/or at the receiver end are a greater distance apart and are operated by or operate upon the opposite ends of a lever journalled at its center in the stationary structure. The balls and rollers 16 are separated by separating members 26, shown on a larger scale in Fig. 2. Said separating members are constituted by discs with a thickness in the axial direction of the tube 12, 13 smaller than the diameter of the balls or rollers 16. Said separating members 26 have a central bore 27 from one side to the other. The members 26 do not have flat sides, but the sides are concave as shown in Fig 2. Thus the members 26 are centered by adjacent balls or rollers so that they will never contact the wall of the guide tube. The concave surfaces could be cylindrical in the case of rollers and spherical in the case of balls. They are made of a material giving low friction of the balls or rollers along them. The balls or rollers could be made of steel, as well as the guide tubes, and the discs 26 could be made of bronze or other material being a good bearing material for steel and nevertheless having a good resistance against pressure.

During the transmission of movement the balls or rollers 16 in the curves are urged against the outer side of the inner wall of the particular guide tube and thus the balls or rollers tend to roll around their point of contact in the tube. Should the balls or rollers contact one another immediately they would cause serious friction and erosion at their points of contact. By using separating members such as 26 of a different kind of material it is possible to prevent this and to lessen the friction considerably.

In practice the system is entirely filled with a lubricant such as oil. This oil will also fill the bores 27 in members 26 and will thus further prevent wear and friction between the balls and the members 26. It is remarked that in Figs. 1 and 2 the members 16 are shown as balls and that the tubular joint 10 is cylindrical so that it could not take up rollers fitting therein, but only balls. As stated before, however, rollers could as well be used, particularly in the receiver and transmitter.

In Fig. 3 a double curve in part of a guide tube 12 is shown. Said curve is filled with balls or rollers 16 separated by separating members 28. Said separating members are shown in detail in Fig. 4. In their center they have a small ball 29 rotatable therein and they are curved spherically along the outside and fit slidingly at the point of engagement of their outer surface in the guide tube 12 or 13. During the transmission of movement the balls or rollers 16 are urged towards the outer wall of the guide tube and thus tend to roll in the same direction. The small ball 29 protrudes from member 28 to both sides and is thus in contact with the two adjacent big balls 16. Thus the small ball 29 begins to rotate in an opposite direction and friction is thus restricted to a minimum. Members 28 could be made of any suitable material with good bearing and sliding properties in combination, taking into consideration the contact with the material of the guide tube and of the smaller balls 29 and the balls or rollers 16. No sliding but only rolling takes place between the balls mutually.

In Figure 5 a curve 15 of a guide tube 12 or 13 is shown in part and this guide tube also comprises balls or rollers 16 fitting movably in the tube. Between any two adjacent balls or rollers 16 a smaller ball or roller 30 is arranged contacting the inner wall of the guide tube at the inner side of the curve.

Spacer members 31 are arranged one for each smaller ball or roller 30. Said spacer members 31 prevent the balls or rollers 30 from moving to the outer side of the curve. They are again made of a material differing from the material of the balls or rollers 16 and 30, so that good bearing and sliding properties are obtained. When an axial load is applied to the large balls 16, they are urged into rolling contact with the outer side of the curve 15. It is in some cases preferable to give the smaller balls or rollers 30 such a small diameter that if movement is to be transmitted and a pushing force is thus exerted upon the members in the tube said balls or rollers 30 are automatically urged towards the inner side of the curve. The balls or rollers 30 are in rolling contact with the inner side of the curve and thus tend to roll in a sense opposite to the sense in which the balls or rollers 16 tend to roll, and thus the balls will in their points of mutual contact move in the same direction as indicated by the arrows in Figure 5, so that friction is reduced. Some sliding will always remain, in view of the difference in diameter of the balls or rollers 16 and 30 and in view of the fact, that the inner side of the curve is always shorter than the outer side of the curve, so that the balls or rollers 30 have to travel a shorter length along the contacting line with the inner side of the curve than the balls or rollers 16 have to travel in contact with the outer side of the curve.

It will be clear that the balls or rollers 30 in general have to be small if it is desired to prevent their contacting the spacer members 31. However, this has disadvantages in that there will be more sliding instead of rolling if the diameter of these sets of balls or rollers differs too much. Moreover the diameter of the balls or rollers should never become too small as this means that they have a too sharp curvature, which is not good for transmitting a pushing force. If the balls or rollers 30 should not contact the spacer members their centers should lie to that side of the connecting line between the centers of two adjacent balls or rollers 16 which is closest to the inner side of the curve. It is preferable in view of the above not to have the center of the balls or rollers 30 lie too far away from said connecting line in the curves or bends.

On the other hand it is also possible to make the balls or rollers 30 of a substantially greater diameter than shown in Figure 5. This will give a resulting force on said balls or rollers towards the spacer members 31 and this will result in sliding of the balls 30 along them, but on the other hand the contact of the balls or rollers 16 and 30 with one another and with the walls of the guide tube will more perfectly approach pure rolling instead of rolling with a considerable amount of sliding. By a suitable choice of the materials of the several parts as indicated above it is possible to prevent the total friction from becoming too high and particularly it is possible to obtain a considerable decrease of friction with respect to devices of known kind in which in the curves or bends there are only balls all of the same diameter fitting accurately and movably in the guide tube.

Figure 6 shows an embodiment in which the guide tube in a bend or curve 15 is rectangular and in which smaller rollers 32 with spacer members 33 alternate with rollers fitting exactly in the tube. A section along the axis of the tube would look about the same as the section shown in Figure 5, with the only difference that the rollers 32 have a considerably greater diameter than the balls or rollers 30 of Figure 5, which also means that the spacer members 33 are smaller than in one direction than the spacer members 31. It should be remembered in this respect that if the guide tube in the bends or curves is circular in cross section there is no absolute certainty that the spacer members 31 of Figure 5 will always remain positioned in contact with the outside of the curves and that the balls 30 (in a circular cross section of the guide tube the members 30 and 16 should be balls and not rollers) will always remain in contact with the inner side of the curve. Each set of one ball 30 and its corresponding spacer member 31 could rotate as a unit about the axis of the tube after lengthy service, and this would spoil the desired effect. It is therefore preferable for such embodiments to use guide tubes of other than circular cross-section, such as the cross sections of the guide tubes shown in Figures 6, 7, 9, 10 and 11.

Figure 7 shows a guide tube bend 15 which is square in cross-section and which in an axial section in the plane of the curve shows the same configuration as Figure 5, with smaller spacer members 34 and large intermediary balls 35, shown with a dotted circle in Figure 7. The bigger balls 36 fit movably in the bend 15 within the square inner cross section thereof.

Figure 8 shows a bend 15 filled with a number of balls 37 all of substantially the same diameter which is substantially smaller than the inner dimension of the guide tube. In view thereof the balls 37 tend to take positions alternately in contact with the inner and with the outer side of the curve. The same could be done with a guide tube with other than circular cross section and with rollers instead of the balls 37. Although the balls in such an embodiment are pushed with a rather considerable force against the wall of the guide tube in the bends 15 this does not matter very much in such an embodiment because there is almost perfect rolling, the only sliding action being possibly caused by the fact that the inner curve is somewhat shorter than the outer curve. This could be prevented entirely by making the diameters of the balls on the outside somewhat greater than the diameters of the balls on the inside of the curve. It even is not disadvantageous in such an embodiment if the balls should not all have their centers in the plane containing the axis of the bend 15 but instead in a curved surface perpendicular to the plane of the drawing, so that they do not contact the inner and outer side of the curve but contact points on opposite sides of the plane of the axis of the curve. This even would have the advantage that the balls all have to travel the same distance during the transmission of movement, so that perfect rolling is possible. The only disadvantage is that the force transmitted for the transmission of the movement urges the balls outwards in the curves or bends so that they all tend to move in the outward direction towards the narrower part of the tube. Figure 8 shows a cage 38 which could prevent the balls from taking this position and could cause them to take the position shown in Figure 8. The main purpose of the cage 38 is, however, to make sure that during filling of the curve 15 with balls said balls indeed lie alternately on one and the other side of the axis of the guide tube. If no such cage should be present and if the balls were filled into the tube without more it could become possible for instance that two neighbouring balls contact the same side of the tube and this would spoil the effect of obtaining almost pure rolling and no sliding. The cage 38 could be made of a thin strip of metal with circular apertures for allowing the balls to contact one another. During filling and for instance after an interruption thereof it is always possible to check at what side the following ball should be inserted. The apertures indicated have a diameter which is somewhat smaller than the diameter of the balls. During filling the cage is pushed into the tube, the balls being inserted in the spaces to both sides of the zig-zag cage just above the end of the tube, from which end the cage is pushed into the tube.

Figure 9 shows part of a bend or curve consisting of a tube having two circular parts 39 and 40 joining one another in the central part at 41 and 42. The tube receives balls 43 and 44 all of the same diameter alternately on one and on the other side, viz. alternately in part 39 and in part 40. The internal distance between the joints 41 and 42 is somewhat smaller than the diameter of the balls 43 and 44. This ensures that it is never possible for a ball to move from part 39 to part 40 or reverse. This guarantees that all the balls always have the correct mutual position.

Fig. 10 shows part of a bend 15 with a rectangular cross section 45 in which a number of balls 46 and 47, all of the same diameter, lie in a zig-zag path similar to the situation of Fig. 8. The long parallel walls of the rectangle 45 could halfway their length have a small rib pointing inwardly so that the same effect is obtained as according to Fig. 9 in that the balls are prevented from moving to the other side of the rectangle.

Fig. 11 shows a curve or bend 15 with a square cross-section 48 being in a plane through a diagonal line thereof. The tube is filled with smaller balls 49, each co-operating with a spacer member 50 and alternating with larger balls, which are indicated schematically by the dotted circle 51 and which fit exactly and movably within the tube.

Fig. 12 shows part of a bend 15 with balls or rollers 16, fitting movably in the tube and alternating with balls 52 having a somewhat smaller diameter. In the curve during the transmission of movement the balls 52 are urged outwardly by the force into contact with the outer wall of the tube but it has appeared in practice that the friction is considerably smaller than in the known embodiments with all the balls fitting exactly in the tube because the balls 52 have the opportunity to give way towards the inner side of the curve. The movement during the transmission will be a combination of sliding and rolling, any two larger balls tending to rotate the smaller ball between them in an opposite direction, the contact with the wall on the outside of the curve tending to rotate the intermediate ball 52 in the same angular direction as the larger balls. In view of the said freedom of any intermediate ball 52 to turn somewhat away from the outside of the curve the device will automatically find such a movement of its parts that the friction is a minimum and is considerably less than when all the balls would have the same diameter fitting in the tube as in known devices of the given kind.

What I claim is:

1. A device for the transmission of movement, comprising a fixed guide tube having a series of pushing members therein movable therealong, said tube having a bend and the pushing members in said bend comprising circular rolling bodies, the circular cross-section of a first group of said bodies in the bend having a diameter substantially the same as the complementary inner dimension of said tube but with sufficient clearance to allow the last-mentioned bodies to move, the circular cross-section of a second group of bodies in said bend having a substantially smaller diameter, the successive larger diameter bodies being separated by the smaller diameter bodies, a driving member movable with respect to said tube for applying a force along the axis of said tube to the first member of said series, and a driven member arranged to be moved along said axis by the last member of said series.

2. A device for the transmission of movement, comprising a stationary guide tube having a curved part and having a series of movable pushing members in said tube including said curved part, the pushing members in said curved part comprising circular rolling bodies, alternate bodies in the series along said curved part having an outer circular cross-section diameter substantially smaller than the complementary inner dimension of the tube, the corresponding diameter of the remaining bodies in the curved part being substantially larger than that of said alternate bodies, a driving member for applying a force along the axis of said tube to the first member of said series of pushing members, and a driven member arranged to be moved along the axis of said tube by the last pushing member of said series.

3. A device for the transmission of movement, comprising a stationary guide tube filled with pushing members fitting movably in said guide tube, said tube having a curved part through which said members move, the pushing members in said curved part comprising circular rolling bodies, a first group of said bodies having an outer circular cross-section diameter substantially smaller than the complementary inner dimension of the tube and a second group of said curved bodies having an outer dimension larger than the corresponding diameter of the bodies of the first group, successive larger bodies being separated by smaller bodies, the larger bodies being in rolling contact with the outer but not with the inner side of the curve of the guide tube.

4. The device of claim 3, wherein the cross-section of said guide tube differs from a circle.

5. The device of claim 3, wherein the cross-section of said guide tube is rectangular.

6. A device for the transmission of movement, comprising a stationary guide tube filled with pushing members fitting movably in said guide tube, said tube having a curved part, the pushing members in said curved part comprising circular rolling bodies, a first group of said bodies having an outer circular cross-section diameter substantially smaller than the corresponding diameter of a second group of said bodies, successive bodies of said second group being separated by bodies of said first group, only the bodies of said first group having rolling contact with the inner side of the curve of the guide tube, and a sliding member between each pair of bodies of the second group and contacting the outer side of the curve of the guide tube, said sliding members preventing the adjacent bodies of the first group between each pair of bodies of the second group from contacting the outer side of said curve.

(References on following page)

References Cited in the file of this patent

UNITED STATES PATENTS

| | | |
|---|---|---|
| 1,483,114 | Root | Feb. 12, 1924 |
| 2,002,709 | Niederhauser | May 28, 1935 |
| 2,298,011 | Hoffar | Oct. 6, 1942 |
| 2,384,742 | Hewitt | Sept. 11, 1945 |
| 2,595,922 | Comnasio | May 6, 1952 |

FOREIGN PATENTS

| | | |
|---|---|---|
| 12,705 | Great Britain | Sept. 3, 1888 |
| 438,735 | France | Mar. 22, 1912 |
| 610,080 | Germany | Mar. 2, 1935 |